United States Patent Office 3,164,319
Patented Jan. 5, 1965

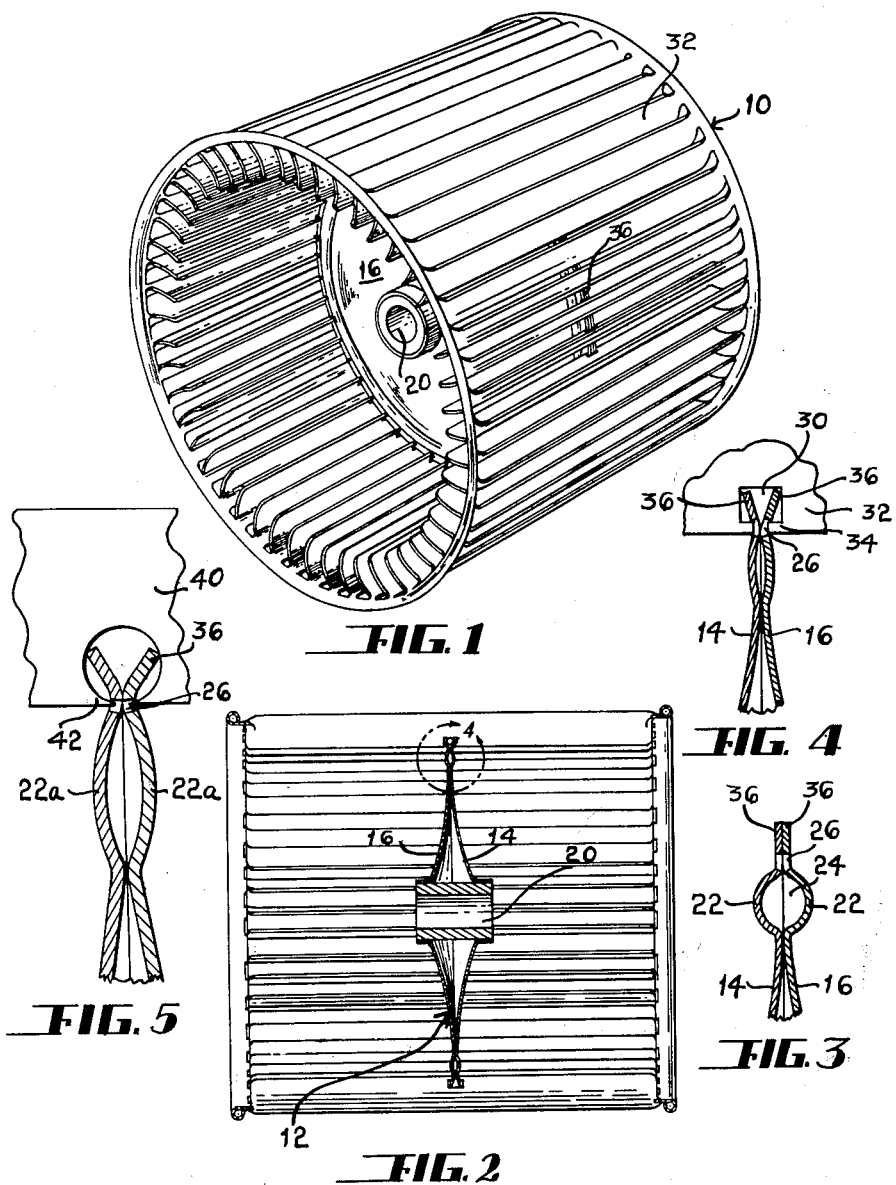

3,164,319
BLOWER WHEEL AND METHOD OF MAKING SAME
Robert A. Mayne, 42 Forrer Road, Dayton 19, Ohio; Ruth D. Mayne, executrix of said Robert A. Mayne, deceased
Filed Oct. 19, 1959, Ser. No. 847,112
8 Claims. (Cl. 230—134)

This invention relates to an improved blower wheel and the method of making same. The invention is not necessarily limited to this art, however, since the techniques herein disclosed are applicable to other arts.

The present invention brings about an improvement in the support of a blower wheel and is related to the blower wheel disclosed in my copending applications Serial No. 385,526, filed October 12, 1953 for Blower Rotor and Method of Making Same (now Patent No. 3,021,591), and Serial No. 543,867, filed October 31, 1955 for Blower Wheel and Method of Making Same, (now Patent No. 2,982,468).

An object of this invention is the provision of a blower wheel which is assembled from a minimum number of parts and which, while simplified in construction, operates with high efficiency.

Another object of this invention is to provide a method for beading the marginal portions of the drum-shaped stampings, so as to increase the rigidity of the blower wheel.

A further object of this invention is to provide a method whereby a spider member may be secured to the blower wheel.

Other objects and advantages reside in the construction of parts, the combination thereof, the method of manufacture and the mode of operation, as will become more apparent from the following description.

In the drawings, FIGURE 1 is a perspective view in slightly reduced scale of the cylindrical wheel showing a spider member engaged therewith.

FIGURE 2 is a sectional side elevational view of the cylindrical wheel and spider member.

FIGURE 3 is an enlarged view of the area bounded by the line 15 in FIGURE 2.

FIGURE 4 is a fragmentary and enlarged view, partly in cross section, disclosing the interlocking of the center support to the blower blade.

FIGURE 5 is a fragmentary and enlarged view, partly in cross section, disclosing a modified interlock between a center support and a blower blade wheel.

Referring to the drawings in detail, the present invention brings about an improvement in a center wheel construction for a blower wheel of the type formed from two concentric sheets of metal stampings, as taught by Mayne et al. in United States Letters Patent No. 2,431,647, issued November 25, 1947. The cylindrical blower wheel shown in FIGURES 1 and 2, however, can be asembled in any manner, as far as the center disc or center support is concerned.

The cylindrical wheel or blade assembly 10 is supported upon a center disc or support 12 comprising two discs 14 and 16 attached to a hub 20 through which extends a suitable boring for a drive shaft, which has not been shown. A circular protrusion 22 is formed adjacent the periphery of each of the discs 14 and 16. Both of the discs 14 and 16 have substantially the same diameter, although not necessarily so limited. When the discs 14 and 16 are assembled upon the hub 20 and attached thereto, the protrusions 22 in the discs 14 and 16 form an annular tube 24, best seen in FIGURE 3, in the spider or center support 12. This annular tube 24 is located adjacent the outer periphery of the discs 14 and 16. A plurality of apertures 26 are located immediately beyond the annular tube 24 formed by the two protrusions 22 of the discs 14 and 16. There is preferably one aperture in each of the discs for each of the blades in the blower wheel. The spacing of the apertures 26 is equal throughout the periphery of the discs 14 and 16. It is not absolutely essential that there be an aperture 26 for each of the blades, in that the apertures may be formed corresponding to every other blade, or at any other suitably spaced interval. The center support assembly 12 is positioned within the cylindrical wheel 10, as clearly shown in FIGURE 2, at the longitudinal or axial center thereof, so that the outer edge of the center support 12 is aligned with the notches 30 in each of the blades 32. As may be clearly seen in FIGURE 4, the notches 30 are widened inwardly from the inner margin of the blades 32, thereby providing tangs 34 aligned with the apertures 26.

After the center disc support 12 has been aligned with the notches 30 in the blades, the protrusions or tubular portions 22 are squashed or flattened, so as to expand the periphery of the center discs 14 and 16. The flanges 36 that were juxtaposed upon each other, as shown in FIGURE 3, are deflected outwardly as the protrusions are flattened or squashed, so as to cause the outer margins of the flanges to engage the widened portion of the notches 30 and so as to cause the tangs 34 to project into the apertures 26 to positively lock the blades in position on the center disc. The apertures 26 limit the outward movement of the blades 32, so that in the event the blower wheel is rotated at a high speed, the blades cannot be pulled by centrifugal force outwardly away from the center disc.

In the event the blower wheel is made from two identical stamped sheets, as disclosed in Patent No. 2,431,647 referred to above, and these two sheets are superimposed upon each other, it follows that the inner radius of alternate blades 32 will differ from the inner radius of the remaining blades by an amount equal to one thickness of the sheet metal used to fabricate the two identical sheets. However, when the diameter of the spider or center support 12 is expanded, all of the blades 32 are forced into circular alignment at the centers thereof.

In the modification disclosed in FIGURE 5, instead of having the type of notch 30 shown in FIGURE 4, the notch may consist of an opening formed by a circular punch that overlaps the margin of the blade 40, so as to leave an opening in the margin between the tangs 42, which opening is at least equal to the thickness of the two discs used in forming one support for the blower wheel, the tangs 42 projecting into apertures 26 after the protrusions 22 have been squashed. As clearly seen in FIGURE 5, the sides of the substantially circular notch diverge from the opening up to the diameter of the opening extending parallel to the inner edge of the blade 40. As the protrusions 22 are squashed, as shown in FIGURE 5, the flanges 36 diverge into engagement with the diverging portion of the notch. In this arrangement, the tangs 42 engaging the notches and the diverging arrangement of the flanges 36 with respect to the diverging sides of the opening or notch cooperate with the tangs 42 to interlock the center disc with the blades, as clearly shown in FIGURE 5. The protrusions 22, upon being squashed, may be substantially parallel to each other, or they may be slightly curved, as shown at 22a in FIGURES 4 and 5. This depends partly upon the apparatus used in squashing the protrusions 22 and upon the type of material used in the two center discs 14 and 16.

In some types of blower wheels, it may be preferable to mount the spider member or center support at one end of the wheel, in which case, only one of the marginal portions need to be beaded, the other being supported by the center disc assembly or spider member. In this event, a single inlet blower wheel is provided instead of a double inlet wheel.

Furthermore, in the double inlet wheel it may be preferable in some installations to have the support assembly mounted to one side of the center of the blower wheel, so that a double inlet wheel is provided wherein the air drawn in from one side may be much greater than the air drawn in from the other side. This arrangement lends itself to the use of a direct drive for a motor where the motor is positioned near or within or partially within the blower wheel, in which event the intake opening is restricted. However, by offsetting the support disc assembly, it is possible to so arrange the parts that the velocity of the air delivered by the two ends of the blower wheel is substantially the same.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A method for use in manufacturing a cylindrical blower wheel including a plurality of blades held in fixed spaced relationship each of said blades having parallel inner and outer edges, each of the blades being provided with a notch in the inner edge thereof, said notch being provided with tangs projecting towards each other, a support including a center disc assembly for supporting the blower wheel, said center disc assembly including a pair of disc members, said method providing apertures in the margins of the disc members into which apertures the tangs project, providing at least one of the disc members with a radially disposed protrusion having a semi-cylindrical shape, the protrusion being near the outer margin of said disc member, flattening the protrusion to thereby separate the outer margins of the disc members so as to position the tangs in contact with the walls of the apertures and the outer margin of said disc member engaging the side of the notch beyond the tangs to thereby positively interlock the blades to the center disc assembly.

2. The method of interlocking a support including a center disc assembly to the substantially radially disposed blades of a blower wheel wherein the blades are equally spaced and extend in a general direction parallel to the axis of rotation of the blower wheel, said method including the steps of forming notches in the inside margins of the blades of the blower wheel, the notches being provided with tangs extending from the sides of the notches towards each other; forming the center disc assembly including forming a pair of disc-like members; forming an annular protrusion near the outer margins of each of the disc-like members, the disc-like members having flange portions projecting parallel to each other beyond the protrusion; forming holes in the flange portions near the outer margins of the protrusions, the distance between the holes being equal to the spacing of the inner margins of the blades; squashing the protrusions, thereby deflecting the flange portions outwardly away from each other into contact with the sides of the notches and so as to seat the tangs in the holes in the flange portions to thereby positively interlock the blades to the center disc assembly.

3. The method of interlocking a center disc assembly to the substantially radially disposed blades of a blower wheel wherein the blades are equally spaced and extend in a general direction parallel to the axis of rotation of the blower wheel, said method including the steps of forming notches in the inside margins of the blower wheel, the notches being provided with tangs extending from the sides of the notches towards each other; forming the center disc assembly including forming a pair of disc members; forming an annular protrusion near the outer margin of at least one of the disc members, the annular protrusion being subtended by a flange portion, the flange portions of the two disc members extending parallel to each other; forming holes in the flange portions of the two disc members, the holes being spaced a distance apart circumferentially equal to the spacing of the inner margins of the blades; squashing the protrusion so as to expand the flange portion of the disc member having the protrusion and so as to project the tangs into the holes in the disc member, the outer portions of the flanges engaging the margins of the notches to thereby positively lock the blades to the center disc assembly.

4. A method of forming a fan wheel comprising the steps of forming two discs with endless circumferential concavo-convex beads adjacent their peripheries, forming apertures near the outer margins of the discs, positioning the discs in facial engagement with the concave surfaces of the beads facing one another and with edge portions of the discs engaging one another, forming a plurality of blades with inner and outer edges, providing inwardly widening slots in the inner blade edges, the slots forming tangs, positioning the blades around the disc peripheries with the disc edge portions in alignment with the slots, and retaining the blades in fixed positions on the discs while compressing the beads together to force the disc edge portions to diverge from one another into engagement with the inwardly widened portions of the slots, and projecting the tangs of the slots into the apertures near the margins of the discs to positively lock the blades to the discs.

5. A method of forming a fan wheel comprising the steps of forming two discs with concavo-convex beads adjacent their peripheries, forming apertures near the outer margins of the discs, positioning the discs with the concave surfaces of the beads facing one another, forming a plurality of blades with inwardly widening slots therein, the outer margins of the slots forming tangs directed toward each other, positioning the blades around the disc peripheries with the disc edge portions in alignment with the slots, and retaining the blades in fixed positions on the disc while compressing the beads together to force the disc edge portions to diverge from one another into contact with the inwardly widened portions of the slots, and projecting the tangs of the slots into the apertures in the discs to positively lock the blades to the discs.

6. A method of forming a fan wheel comprising the steps of forming two discs with concavo-convex beads adjacent their peripheries, forming apertures in the discs near the outer margins thereof, positioning the discs with the concave surfaces of the beads facing one another, forming a plurality of blades with inwardly widening slots therein, said slots having tangs projecting toward each other, providing two rim members, the ends of the blades and the rim members forming a unitary assembly, positioning the discs between and parallel to the rims with the disc peripheries in alignment with the slots, and compressing the beads toward one another to force the disc edge portions to diverge from one another into engagement with the sides of the slots and to project the tangs into the apertures of the discs to positively lock the blades to the discs.

7. A double inlet fan wheel comprising a double walled substantially centrally disposed radially extended disc, an end ring positioned on each side of the centrally disposed disc and spaced therefrom, a plurality of longitudinally extending narrow blades forming a cylindrical blower wheel, the blades being disposed at an angle radially and having inner and outer blade edges and being curved transversely to provide concave working surfaces, the opposite longitudinally spaced ends of the blades being secured to the end rings, the inner edges of the blades being contoured substantially midway longitudinally of the blades to provide notches having tangs near the outer edges of the blades, the peripheral edges of the double walled central disc having apertures and projecting radially into the notches in the blades and extending axially in opposite directions, the tangs on the blades projecting into contact with the apertures of the discs to positively lock the blades to the discs, and the outer margins of the discs engaging the sides of the notches to provide a four point support for each blade.

8. A fan wheel comprising generally circular disc means having first and second peripheral edge portions thereof diverging from one another; said disc means having apertures in the diverging portions, blade means arranged around the disc means comprising a series of blades having slots in their inner edges; said slots having relatively narrow mouth portions and relatively wide rear portions providing tanks projecting toward each other near the inner edges of the blades, and the disc means having its peripheral edge portions extending through the slot mouth portions into the slot rear portions with the tangs projecting into the apertures in the diverging surfaces thereof so that the tangs positively prevent outward ballooning of the blades from the disc means during high speed operation of the wheel, the outer margins of the discs engaging the sides of the slots.

References Cited in the file of this patent
UNITED STATES PATENTS

| | | |
|---|---|---|
| 504,208 | Fox | Aug. 29, 1893 |
| 879,382 | Harris | Feb. 18, 1908 |
| 882,521 | Jude | Mar. 17, 1908 |
| 886,515 | Jude | May 5, 1908 |
| 903,532 | Anderson | Nov. 10, 1908 |
| 931,403 | Fleming | Aug. 17, 1908 |
| 1,602,009 | Germeyer | Oct. 5, 1926 |
| 2,125,697 | Swingle et al. | Aug. 2, 1938 |
| 2,240,238 | Baker | Apr. 29, 1941 |
| 2,304,581 | Lyon | Dec. 8, 1942 |
| 2,537,805 | Wilken | Jan. 9, 1951 |
| 2,626,741 | Osborne | Jan. 27, 1953 |
| 2,852,182 | Wilken | Sept. 16, 1958 |
| 2,928,587 | Austin et al. | Mar. 15, 1960 |
| 3,004,326 | Merz | Oct. 17, 1961 |